May 9, 1950

A. W. NIEMANN ET AL 2,506,648

GRAPHIC RECORDER WITH PERMANENT
MAGNET AND PIVOTING COIL

Filed May 18, 1949

INVENTORS
ARTHUR W. NIEMANN
LEWIS P. REITZ, JR.
BY
ATTORNEY

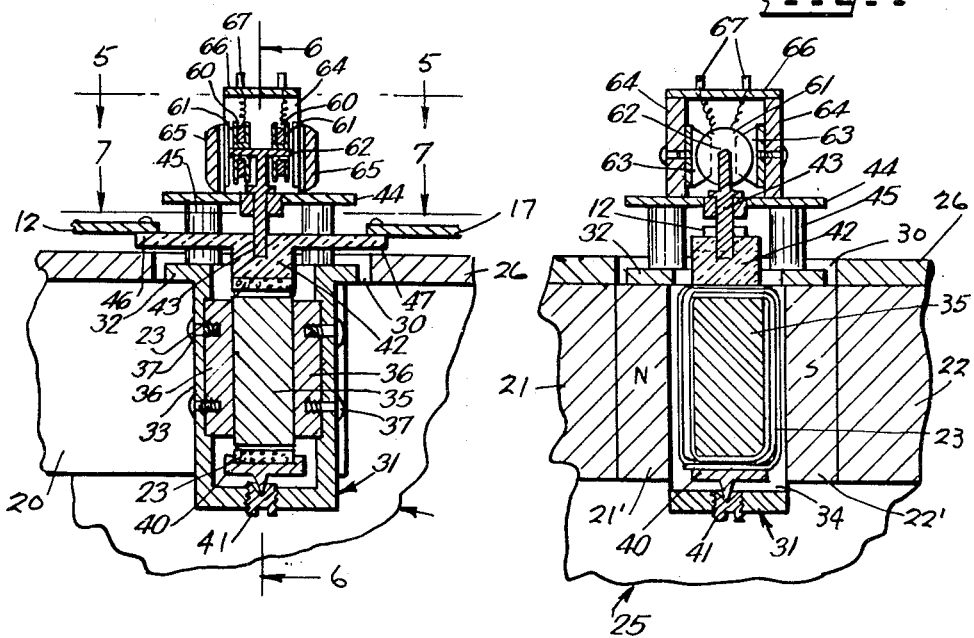

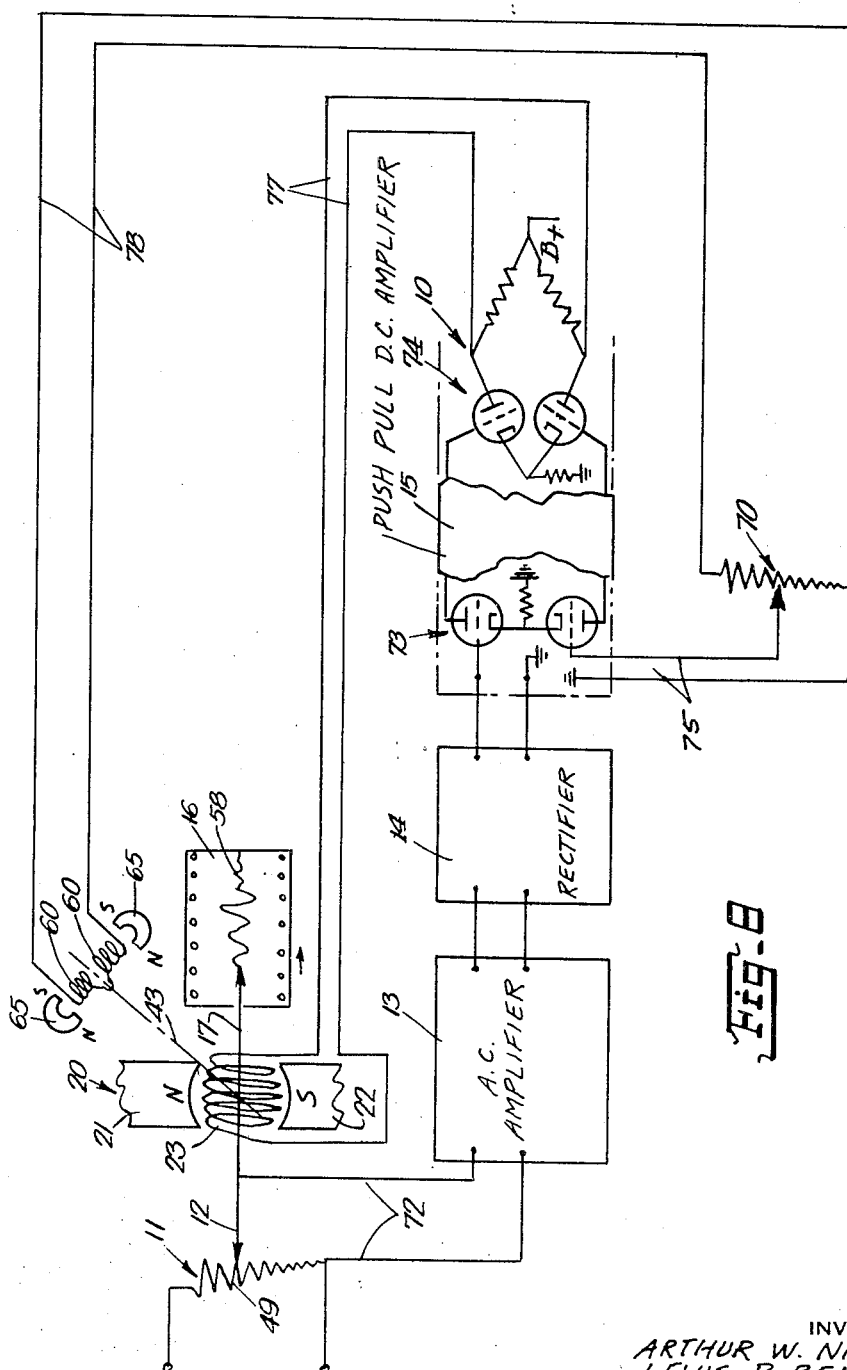

UNITED STATES PATENT OFFICE 2,506,648

GRAPHIC RECORDER WITH PERMANENT MAGNET AND PIVOTING COIL

Arthur W. Niemann, Millington, and Lewis P. Reitz, Jr., Morristown, N. J., assignors to Sound Apparatus Co., Stirling, N. J., a firm composed of Arthur W. Niemann and Helen I. Niemann Application May 18, 1949, Serial No. 93,868

4 Claims. (Cl. 346—32)

This invention relates to new and useful improvements in graphic recorders for recording A. C. voltage levels, A. C. voltage wave forms, and varying D. C. voltages.

More specifically, this invention proposes improvements in those graphic recorders using an electrical bridge, an input potentiometer having an adjustable potentiometer arm, an electric amplifier electrically connected with said potentiometer and having an input including said potentiometer arm, and an output impressed on said electrical bridge, and recording means including a driven record sheet and a recording stylus.

Heretofore, in these prior graphic recorders it was customary to provide some means operated by the output of said electrical bridge and connected with said potentiometer arm for varying the input to said amplifier and bridge to seek to restore a balance in the bridge as the input voltage to said potentiometer changes. It was customary to connect the recording stylus to said means in order to graphically imprint on said record sheet the variations in the input to said potentiometer. Particularly, this invention proposes to improve the means connecting the output of the electrical bridge with the potentiometer arm to seek to restore the balance in the bridge.

Heretofore, the connecting means between the output of the bridge and the potentiometer arm, in one form of graphic recorder, was in the nature of a magnetic clutch having a pair of coils connected with the output of the bridge and wound on the two sides of a magnetic disc cooperative with the prongs of a magnetic carriage slide located on the edges of the disc arranged so that the carriage is caused to travel in one direction or the other, depending upon the variations in the input of the potentiometer. A graphic recorder of this construction is, relatively speaking, slow and therefore inaccurate because of the relatively great ratio between the mass moved and the force used in moving the mass, particular reference being had to the mass of the magnetic carriage slide, the two prongs, and the other movable parts of the magnetic clutch. Moreover, this type of graphic recorder is inaccurate at higher speeds because of slippage and mechanical resistances in the operation of the clutch.

In other prior graphic recorders, instead of making use of a magnetic clutch a D. C. servomotor was used. However, this type of recorder is also relatively inaccurate and slow because of the great mass-to-force ratio. In other words, the parts required to be moved in the operation of the device are relatively heavy in relation to the force available to move them.

The dominating object of this invention is to improve the connecting means between the electrical bridge and the potentiometer arm so as to provide a greater force-to-mass ratio of the moving parts in order that recording may be accomplished with greater speed, greater accuracy, and greater stability. Obviously, if the force-to-mass ratio is greater the recording stylus will be capable of moving at a greater speed and the accuracy and stability of the recorder will thus be improved.

In prior recorders the maximum speed of the recording stylus was approximately 16 inches per second. This invention proposes to so increase the force-to-mass ratio as stated above so that the maximum new recording speed will be in excess of 80 inches per second. This latter speed has been actually obtained by a recorder constructed in accordance with this invention, as will be described in detail in this specification.

More specifically, in order to obtain the greater force-to-mass ratio referred to, it is proposed to make use of a permanent magnet having spaced north and south poles, and to provide a coil connected with the output of said bridge and positioned in the field of said magnet between its poles and pivotally mounted on an axis at right angles to the magnetic lines of said magnet in order to pivot in one direction or the other in accordance with changes in the current passing through said coil. It is proposed that the recording stylus be mounted on and operated by said moving coil in order to record the changes of the current passing through said coil and in this way changes in the input voltage to the potentiometer. It is also proposed that the potentiometer arm be mounted on and be moved by said coil in order to vary the input to the amplifier and bridge to seek to restore a balance in said bridge as the input voltage to the potentiometer changes. With this new construction the mass required to be moved is relatively light, comprising merely the coil and a supporting frame upon which the coil is mounted. It is because of this light mass that the new recorder has a greater force-to-mass ratio and therefore is capable of recording with greater speed, accuracy and stability.

It is recognized that for certain recordings it is necessary that the recording stylus move at a slower rate than the maximum rate that it is capable of moving. For this reason it is proposed to provide a new and exceptionally simple and efficient control by which the stylus speed may be continuously varied as desired. Particularly, it is proposed that this control be in the nature of means for dampening the pivoting of said coil and in this way controlling the writing speed of the stylus. It is contemplated to characterize this new dampening means by differential coils through which an iron vane is physically connected and moved by said coil, and to provide a permanent magnet or magnets near said differential coils to provide the vane with a magnetic field in order that a current is generated by its motion, which is in proportion to the velocity of said coil. A speed control potentiometer is connected in a circuit connecting said differential coils in series with the electric amplifier of the graphic recorder in order to set up a current opposed to the current which pivots the first mentioned coil and in this way dampen the pivoting of the first mentioned coil for controlling the writing speed of the stylus.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 4 is an enlarged detail view of the central portion of Fig. 2.

Fig. 5 is a fragmentary horizontal sectional view taken on the line 5—5 of Fig. 4.

Fig. 6 is a vertical sectional view taken on the line 6—6 of Fig. 4.

Fig. 7 is a fragmentary horizontal sectional view taken on the line 7—7 of Fig. 4.

Fig. 8 is a schematic wiring diagram of the device.

Figure 1:
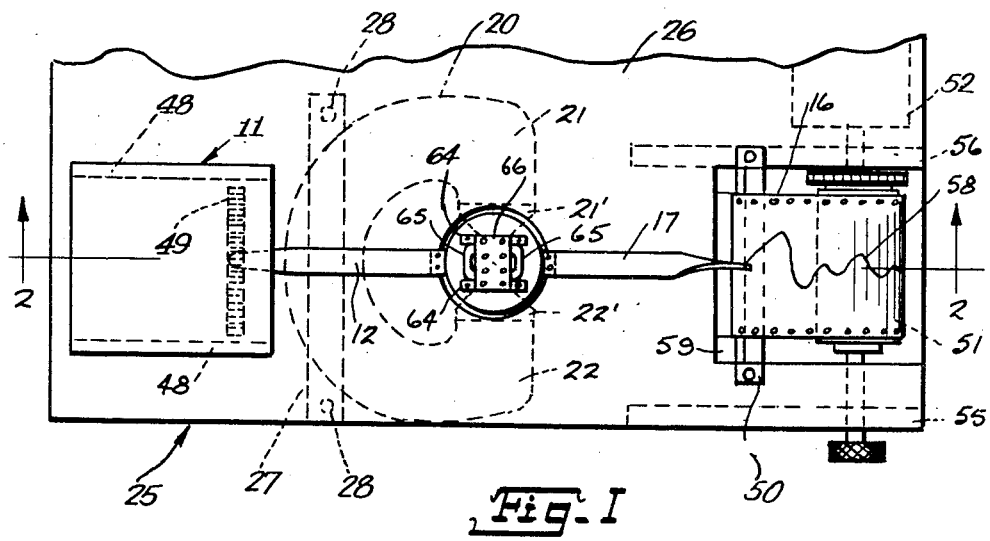
Fig. 1 is a fragmentary plan view of a graphic recorder with a permanent magnet and a pivoting coil constructed in accordance with this invention.
Figure 2:
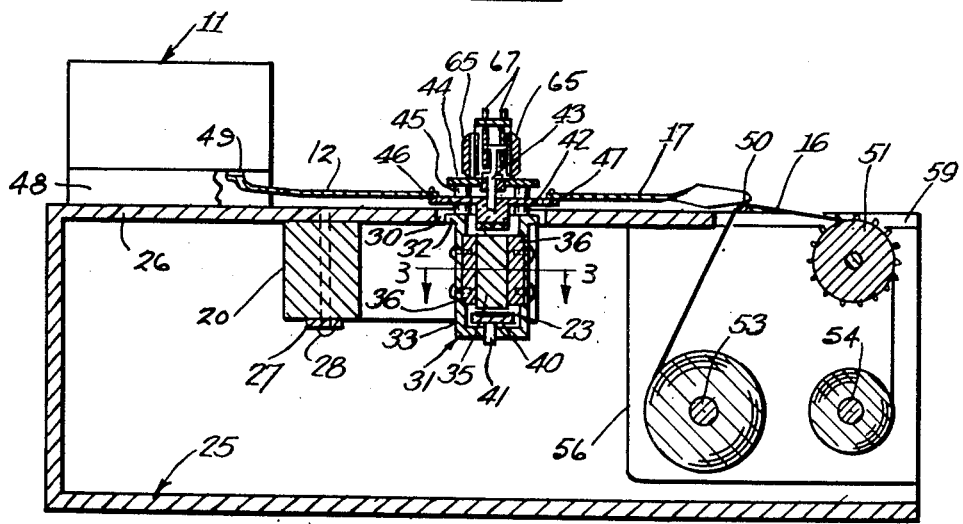
Fig. 2 is a vertical sectional view taken on the line 2—2 of Fig. 1.

The graphic recorder with permanent magnet and pivoting coil, in accordance with this invention, includes an electrical bridge 10 (see Fig. 8), an input potentiometer 11 having an adjustable potentiometer arm 12, an electric amplifier 13, 14 and 15 electrically connected with said potentiometer 11 and having an input including said adjustable potentiometer arm 12 and an output impressed on said electrical bridge 10. The recorder is also provided with recording means including a driven record sheet 16 and a cooperative recording stylus 17. The graphic recorder as broadly described up to this point is identical in construction to many prior graphic recorders and forms no part of this invention.

The invention resides in the provision of a permanent magnet 20 having spaced poles 21 and 22, and a cooperative coil 23 connected with the output of said bridge 10 and positioned in the field of said magnet 20 between its poles 21 and 22 and pivotally mounted to pivot on an axis at right angles to the magnetic lines of said magnet 20 in order to pivot in one direction or the other in accordance with changes in the direction of current passing through said coil. Said recording stylus 17 is mounted on and operated by said coil 23 in order to record the changes in the current passing through said coil and in this way changes in the input voltage to said potentiometer arm 12 is mounted on and moved by said coil 23 in order to vary the input to said amplifier 13, 14 and 15 and said bridge 10 to seek to restore a balance in said bridge 10 as the input voltage to said potentiometer changes.

The graphic recorder as illustrated also includes a casing 25 having a top wall 26 of non-magnetic material. The permanent magnet 20 is mounted on the bottom of the top wall 26 by a support strip 27 engaged beneath it and secured in position with fastening elements 28 attached to the top wall 26. The poles 21 and 22 are provided with soft iron pole pieces 21' and 22', respectively.

Figure 3:
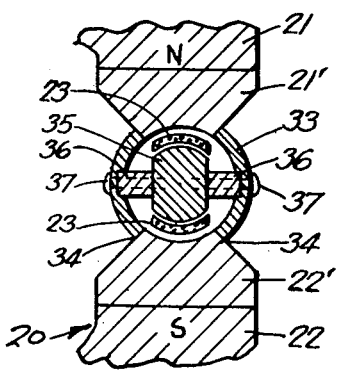
Fig. 3 is a fragmentary enlarged horizontal sectional view taken on the line 3—3 of Fig. 2.

The top wall 26 is formed with an opening 30 in which a bracket 31 is mounted. This bracket 31 is of non-magnetic material. It is provided with a top flange 32 attached to the pole pieces 21' and 22'. The bracket 31 has a hollow cylindrical body 33 which extends down between the pole pieces 21' and 22'. This body 33 has side openings 34 (see Fig. 3), into which the tips of the pole pieces 21' and 22' extend. A steel core 35 is supported axially in the body 33 with a pair of side strips 36 which are attached by fastening elements 37 to the sides of the body 33. This steel core 35 is for the purpose of insuring a uniform magnetic field between the poles of the magnet 20.

The coil 23 is in the nature of a loop encircling but free of the core 35. It is supported by a frame consisting of a bottom pivot section 40 attached to the bottom of the coil 23 and associated with a pivot support 41 mounted on the bottom of the bracket 31, and a top pivot section 42 of insulation material mounted upon the top of the coil 23 and associated with a spindle 43 turnably mounted on a ring 44 supported by several bushings 45 mounted on the flange 32. The top pivot section 42 is provided with a pair of diametrically opposite arms 46 and 47 which extend outwards between the bushings 45. The potentiometer arm 12 is mounted on the arm 46, while the recording knife edge stylus 17 is mounted on the arm 47.

The potentiometer 11 is mounted upon a pair of spaced strips 48 which in turn are mounted on the top face of the top wall 26. The resistance 49 of the potentiometer 11 is arranged upon its bottom in the path of motion of the end of the potentiometer arm 12. The driven record sheet 16 engages over a transverse knife 50 mounted across an opening 59 formed in the top wall 26. The said record sheet 16 engages over a drive drum 51 which is connected with a drive means 52, not shown in detail. The record sheet 16 is supplied from a supply roll 53 and is drawn upon a receiving roll 54. The drum 51 and the rolls 53 and 54 are mounted upon support walls 55 and 56 attached upon the bottom of the top wall 26 to the sides of the opening 59. Preferably, the record sheet 16 is a colored sheet covered with wax so that the knife edge stylus 17 may scratch the record 58 thereon during the operation of the recorder.

A continuously variable speed control is provided for the stylus 17. This speed control includes a pair of differential coils 60 wound upon spools 61 which are mounted upon a cross iron vane 62 supported upon the top of the spindle 43. A pair of channel-shaped pole pieces 63 (see Fig. 5) are mounted upon spaced walls 64 which are mounted on the ring 44. Small magnets 65 adhere by their magnetism to the pole pieces 63. A top wall of insulation material 66 is mounted across the walls 64. Terminals 67 are mounted on the top wall 66 and connected with the coils 60. The coils 60 are connected in series with each other (see Fig. 8) and with a speed control potentiometer 70. This potentiometer 70 is connected with the electric amplifier 15.

The electric amplifier 13, 14 and 15 in the particular design of graphic recorder illustrated is composed of three distinct parts. The part 13 comprises an A. C. amplifier, the part 14 a rectifier, and the part 15 a push pull D. C. amplifier. The A. C. amplifier 13 is connected by the circuit 72 with the potentiometer 11. The push pull D. C. amplifier 15 has a first stage indicated generally by reference numeral 73, and a last stage indicated by numeral 74. The potentiometer 70 is connected by a circuit 75 in series with one of the tubes of the first stage 73 of the push pull D. C. amplifier 15. The last stage 74 of the push pull D. C. amplifier 15 connects with the input of the bridge 10. Circuit 77 connects the output of the bridge 10 with the coil 23. Circuit 78 connects the potentiometer 70 with the differential coils 60.

All parts of the graphic recorder in close proximity of the magnet 20 must be constructed of non-magnetic material so as not to divert the magnetic flux from the permanent magnet. The top pivot section 42 is constructed of electric insulation material so that the circuit 72 may be connected with the potentiometer arm 12 without grounding same.

The operation of the graphic recorder may be understood from the following.

A change in the input to the potentiometer 11 will be amplified and rectified by the amplifier 13 and rectifier 14 and will be impressed upon the push pull D. C. amplifier 15, which in turn impresses the change upon the bridge 10. The tubes 74 of the last stage of the amplifier 15 will alternately vary plus or minus, depending upon the impressed variation in the input to the potentiometer 11. These changes unbalance the bridge 10 and consequently a current will flow in one direction or in the other direction in the circuit 77 and in the coil 23. When current flows in the coil 23 it will cut the magnetic lines from the magnet 20 and consequently the coil 23 will turn in one direction or the other, depending on the direction of flow of current in said coil 23. This turning of the coil 23 carries along the stylus 17 which records on the driven record sheet 16. When the coil 23 turns in one direction or the other it will correspondingly turn the spindle 43 and the vane 62, which will move the differential coils 60 in the magnetic field of the magnets 65 in proportion to the velocity of the coil 23. A current of a variable nature will therefore be generated in the coils 60 which will flow through the circuit 78 and which may be controlled by the potentiometer 70 and which will be impressed upon the first stage of the push pull D. C. amplifier 15. The poles of the magnets 65 are so arranged that the current from the differential coils 60 will flow in the opposite direction to the current passing through the amplifier 15 in order to oppose the motion of the coil 23. For this reason the potentiometer 70 may be varied continuously to continuously vary the stylus speed 17 because the current from the coils 60 is used to dampen the motion of the coil 23. When the coil 23 turns it carries along the potentiometer arm 12 which seeks a new position so as to bring the bridge 10 back into balance. In this way the recorder continues for all changes in the input potentiometer 11 and records upon the driven record sheet 16.

An important feature of the invention resides in the fact that the graphic recorder has a relatively large force-to-mass ratio in so far as the mass of the moving coil 23 and the parts carried and connected with the coil 23 are relatively light in relation to corresponding moving parts in prior graphic recorders. Consequently, the force-to-mass ratio will be greater and the recording speed, accuracy and stability of the new recorder enhanced in relation to prior recorders.

While we have illustrated and described the preferred embodiment of our invention, it is to be understood that we do not limit ourselves to the precise construction herein disclosed and the right is reserved to all changes coming within the scope of the invention as defined in the appended claims.

Having thus described our invention, what we claim as new and desire to secure by United States Letters Patent is:

1. A graphic recorder with permanent magnet and pivoting coil, comprising an electrical bridge, an input potentiometer having an adjustable potentiometer arm, an electric amplifier electrically connected with said potentiometer and having an input including said adjustable potentiometer arm and an output impressed on said electrical bridge, recording means including a driven record sheet and a recording stylus, a permanent magnet having spaced north and south poles, and a coil connected with the output of said bridge and positioned in the field of said magnet between its poles and pivotally mounted to pivot on an axis at right angles to the magnetic lines of said magnet in order to pivot in one direction or the other in accordance with changes in the current passing through said coil, and said recording stylus being mounted on and operated by said coil in order to record the changes in the current passing through said coil, and said potentiometer arm being mounted on and moved by said coil in order to vary the input to said amplifier to seek to restore a balance in said bridge as the input voltage to said potentiometer changes.

2. A graphic recorder with permanent magnet and pivoting coil, comprising an electrical bridge, an input potentiometer having an adjustable potentiometer arm, an electric amplifier electrically connected with said potentiometer and having an input including said adjustable potentiometer arm and an output impressed on said electrical bridge, recording means including a driven record sheet and a recording stylus, a permanent magnet having spaced north and south poles, and a coil connected with the output of said bridge and positioned in the field of said magnet between its poles and pivotally mounted to pivot on an axis at right angles to the magnetic lines of said magnet in order to pivot in one direction or the other in accordance with changes in the current passing through said coil, and said recording stylus being mounted on and operated by said coil in order to record the changes in the current passing through said coil, and said potentiometer arm being mounted on and moved by said coil in order to vary the input to said amplifier to seek to restore a balance in said bridge as the input voltage to said potentiometer changes, and means for dampening pivoting of said coil for controlling the writing speed of said stylus.

3. A graphic recorder with permanent magnet and pivoting coil, comprising an electrical bridge, an input potentiometer having an adjustable potentiometer arm, an electric amplifier electrically connected with said potentiometer and having an input including said adjustable potentiometer arm and an output impressed on said electrical bridge, recording means including a driven record sheet and a recording stylus, a permanent magnet having spaced north and south poles, and a coil connected with the output of said bridge and positioned in the field of said magnet between its poles and pivotally mounted to pivot on an axis at right angles to the magnetic lines of said magnet in order to pivot in one direction or the other in accordance with changes in the current passing through said coil, and said recording stylus being mounted on and operated by said coil in order to record the changes in the current passing through said coil, and said potentiometer arm being mounted on and moved by said coil in order to vary the input to said amplifier to seek to restore a balance in said bridge as the input voltage to said potentiometer changes, and means for dampening pivoting of said coil for controlling the writing speed of said stylus, comprising a differential coil, an iron vane engaging through said differential coil and physically connected with and moved by said first named coil, a permanent magnet near said differential coil to provide it with a magnetic field, a speed control potentiometer, and a circuit connecting said differential coil and speed control potentiometer in series with said electrical amplifier in order to set up a current proportional to the velocity of said first named coil and opposed to the current which pivots said first named coil.

4. A graphic recorder with permanent magnet and pivoting coil, comprising an electrical bridge, an input potentiometer having an adjustable potentiometer arm, an electric amplifier electrically connected with said potentiometer and having an input including said adjustable potentiometer arm and an output impressed on said electrical bridge, recording means including a driven record sheet and a recording stylus, a permanent magnet having spaced north and south poles, and a coil connected with the output of said bridge and positioned in the field of said magnet between its poles and pivotally mounted to pivot on an axis at right angles to the magnetic lines of said magnet in order to pivot in one direction or the other in accordance with changes in the current passing through said coil, and said recording stylus being mounted on and operated by said coil in order to record the changes in the current passing through said coil, and said potentiometer arm being mounted on and moved by said coil in order to vary the input to said amplifier to seek to restore a balance in said bridge as the input voltage to said potentiometer changes, and means for dampening pivoting of said coil for controlling the writing speed of said stylus, comprising a spindle coaxially of and mounted on said coil, an iron vane on said spindle, a differential coil supported by said iron vane which engages therein, a permanent magnet near said differential coil to provide it with a magnetic field, a speed control potentiometer, and a circuit connecting said differential coil and speed control potentiometer in series with said electric amplifier in order to set up a current opposed to the current which pivots said first named coil.

ARTHUR W. NIEMANN.
LEWIS P. REITZ, Jr.

REFERENCES CITED

The following references are of record in the file of this patent:

UNITED STATES PATENTS

| Number | Name | Date |
|---|---|---|
| 2,276,816 | Bagno | Mar. 17, 1942 |
| 2,346,437 | Krogh | Apr. 11, 1944 |
| 2,396,187 | Means et al. | Mar. 5, 1946 |
| 2,464,708 | Moseley | Mar. 15, 1949 |